3,406,028
HARD-FACING MATRIX COMPOSITION AND METHOD OF PREPARING SAME
Herbert J. Woock, 420 California St., Arcadia, Calif. 91006
No Drawing. Filed July 27, 1964, Ser. No. 385,452
13 Claims. (Cl. 106—1)

ABSTRACT OF THE DISCLOSURE

A hardfacing composition for bonding dispersed carbides and the like abrasion resistant particles to a metallic body at a fusing temperature of 1950 degrees F. to 2100 degrees F. in a furnace atmosphere approximately in the range of 9 to 11 percent $CO_2$ oxidizing, the composition comprising cobalt, ferrochromium, ferromanganese, ferromolybdenum, ferroboron, ferrosilicon, nickel, copper and a suitable bonding flux.

---

This invention relates to the hard-facing of metals with wear-resisting coatings and more particularly to an improved hard-facing matrix composition suitable for use in bonding high temperature exceptionally tough wear-resisting materials in a coating of a desired thickness to areas of a metal body sought to be protected against abrasion and wear.

The composition of the present invention is distinctly different in properties and characteristics from a related but specifically different matrix composition disclosed in my United States Patent 2,611,710 dated Sept. 23, 1952. That matrix composition possesses very superior qualities over prior compositions but requires bonding temperatures of approximately 2250° F. An excellent bond and protective coating is achieved but it is found that furnace chambers operating at this temperature are subject to accelerated deterioration necessitating frequent and costly repairs. In fact furnace deterioration becomes particularly pronounced and rapid at temperatures in excess of 2100° F. These costs added to the other high costs attending the hard-facing of metal with carbides are a serious deterrent to hard-facing operations.

Accordingly a principal object of the present invention is to provide an improved matrix composition suitable for hard-facing operation and avoiding the shortcomings, and disadvantages of compositions heretofore provided. More particularly it is an object of the present invention to provide an improved matrix composition suitable for use in bonding highly efficient wear-resisting material to metals at a temperature not in excess of 2100° F. and preferably at 2025° F. plus or minus 75° F. Although it is known that the melting temperature of alloyed metals can be varied by the utilization of varying quantities and kinds of metal constituents, complex problems are presented in the discovery of a satisfactory hard-facing matrix involving much more than finding an alloy composition having the desired fusing temperature in a furnace having an atmosphere approximately in the range of 9 to 11 percent $CO_2$ oxidizing. For example, it is of critical importance, owing to the high cost of the carbide constituents, that the materials used for bonding purposes exhibit very tough abrasion resistant qualities and effectively supplement the carbides in resisting wear. Additionally it was highly important that the resulting hard-facing be highly wear resistant, resistant to spalling, be reasonably ductile and not subject to the formation of fissures or crazing, and be reasonably free from pores and surface imperfections. It was also essential that the hard-facing composition lend itself readily to ease of application in a uniform layer over any desired surface area of an article to be coated in thicknesses varying according to the need for wear-resisting protection. Additionally the composition should be one which could be easily prepared by unskilled persons, mixed into a controllable application mixture and be applied to articles undergoing hard-facing with a minimum of equipment and easily regulated under widely varying manufacturing conditions. And the cost of the entire operation, including the cost of the constituent materials, the cost of the furnace and its operation, and the cost of mixing the hard-facing composition and of the apparatus for applying it must be as low as possible. The nature of the bonding matrix is a major factor affecting the cost of each of these individual operations.

The foregoing and other desirable attributes of an improved, superior hard-facing composition are present to a prominent degree in the present invention featuring a relatively low temperature hard-facing bonding matrix suitable for use with a wide variety of abrasion and wear resistant materials. Furthermore, whereas the above referred to prior bonding matrix of my Patent 2,611,710 was most conveniently and satisfactorily prepared in two separate alloying operations following which pigs cast from these operations were first finely ground and then intermixed in appropriate proportions, the present bonding matrix is prepared in a single alloying operation following which the pigs cast therefrom are ground to the requisite degree of fineness in readiness for admixture with the desired flux and the ground carbides or other materials exhibiting particularly high hardness, toughness and abrasion resistant properties.

The matrix composition of the present invention, bondable to iron and steel in a very satisfactory manner at a temperature of 2025° F. plus or minus 75° F., in a furnace atmosphere approximately in the range of 9 to 11 percent $CO_2$ oxidizing, contains the following ingredients:

| Material | Type | Preferred quantity in percent by weight | Permissible range (percent) |
|---|---|---|---|
| Cobalt | Commercially pure | 4.8 | 1–8 |
| Ferrochromium | 65–68% Cr | 24.0 | 15–30 |
| Ferromanganese | 74–76% Mn | 4.5 | 1–8 |
| Ferromolybdenum | 50–75% Mo | 2.0 | 0–5 |
| Ferroboron | 16–20% B | 1.5 | 0–3 |
| Ferrosilicon | 83–88% Si | 10.0 | 6–15 |
| Nickel | Commercially pure | 52.5 | 40–60 |
| Copper | do | 9.7 | 0–3 |

The foregoing constituents are accurately measured and thereafter melted into a homogeneous alloy using an induction furnace. Although the average of the melting temperatures of the above enumerated constituents is approximately 3400° F., it is found that the various ingredients melt at a furnace temperature of about 3100° F. This temperature is maintained for three to five minutes after the constituents become molten during which thorough rolling and intermixing of the ingredients takes place to form a true homogeneous alloy. Thereafter the alloy is poured into pigs which, after cooling, are crushed and pulverized to a mesh size not exceeding 60. Any subsequent melting of this alloy takes place at about 1950° F.

It is pointed out that any of two of the ingredients ferromolybdenum, ferroboron, and copper may be omitted when preparing the invention bonding alloy. However, it is found desirable that two of these three constituents be present in a substantial quantity within the range specified above.

The presence of ferromolybdenum is highly desirable to prevent spalling and to increase the toughness and shock-resistance qualities of the coating. The presence of ferroboron enhances the hardness and toughness, provides a refined type grain, and aids the deoxidizing properties of the alloy. Copper together with the ferromanganese both aid very materially in lowering the eutectic temperature of the alloy and the copper contributes beneficially to the ductility of the alloy but adversely affects the wear-resisting qualities.

The matrix composition so prepared is now ready for mixture with other ground materials having the desired hardness and abrasion qualities, particularly one or more of the carbides such as tungsten carbide, boron carbide, molybdenum carbide and titanium carbide, in percentages, by weight, varying from zero to 80% depending upon the end use and the particular characteristics desired in the finished coating of hard-facing. For example, a matrix composition containing 20 percent carbides would contain 80 percent by weight of matrix materials, excluding flux. In this connection it will be understood that the higher the percentage of carbide the greater the wear resistance and the cost. However, in this connection, it is pointed out that it is undesirable to use more than 10% by weight of boron carbide owing in large part to its very considerably lower specific gravity and great volume. All other carbides are relatively heavy.

Another important constituent desirably added simultaneously with the carbide is a suitable flux. In general a variety of fluxes well known to those skilled in this art are quite satisfactory with certain notable exceptions. For example certain carbides particularly tungsten carbide not infrequently are found to include certain impurities which, when mixed with certain fluxes, cause excessive and objectionable voids or gas pockets. This problem can be eliminated by using a flux having the following composition:

| Material | Preferred quantity in percentage by weight | Permissible range in percent by weight |
|---|---|---|
| Boric acid (granular) | 74 | 68–85 |
| Borax (granualr) | 21 | 10–27 |
| Sodium silicate (dry granular) | 5 | 2–10 |

Flux of this composition is preferably added to the dry materials (matrix composition plus carbides) in the preferred amount of 6% by weight. However, it is pointed out that the permissible quantity of the flux constituents may vary from 3 to 8 percent by weight.

The sodium siilcate constituent of the flux could be omitted from the flux itself and added to the dry materials along with water in an amount necessary to otbain a hard-facing mixture having a thick, creamy consistency found best suited for handling, application and retention on the article being coated in the desired coating thickness. However, best results are obtained when the sodium siilcate is first mixed with the flux in which case it is merely necessary to add water in the proper amount to obtain the requisite creamy mixture of the final hard-facing composition.

If the particular tungsten carbide constituent does not display the aforementioned porous characteristics, then it is quite satisfactory to use the flux composition described in my Patent 2,611,710 or other fluxes known to those skilled in this art. For best results, I prefer to use either the above described flux composition or that disclosed in my earlier patent.

The described hard-facing composition, including the flux and carbides, is preferably mixed in the manner and using the apparatus described in my United States Patents No. 3,056,383 and 3,056,693. In this connection it is pointed out that two parts liquid sodium silicate be mixed with one hundred parts of water and employed as a liquid medium for mixing with the dry materials to render these free-flowing and adherent to one another and to the surface being coated for protection. The presence of the sodium silicate is found highly beneficial in eliminating trapped air and in stabilizing the creamy mixture. Although the reasons for these beneficial results are not thoroughly understood, it is believed that objectionable quantities of air tend to become trapped in voids and microscopic pockets opening through the surface of the constituent particles during the mixing, agitation, and circulating operations. The presence of such trapped air is highly undesirable and its presence is believed one of the causes of poor and improper fusing because of its oxidizing tendencies. Such oxidation interferes with the bonding operation and will result in an imperfect, weak and unsatisfactory finished product. Regardless of the real explanation, it is known that the presence of a small amount of sodium silicate produces a far more satisfactory, uniform and superior hard-facing product.

After a coating of the desired thickness, usually varying from 0.005 to 0.125 inch has been applied, the coated object is subjected to a drying operation with application of heat ranging from 100° F. to 300° F. After the water has been driven off in this manner, the dried coating will be found to have sufficient durability to withstand ordinary careful handling. The coated part is then transferred into a gas-fired furnace for the requisite period to heat the coating to a bonding temperature of 2025° F. plus or minus 75° F. in a predetermined properly controlled atmosphere.

The bonding operation is carried on in a gas-fired furnace operated at about 1950° F. to 2100° F. and so regulated and controlled that the internal furnace atmosphere contains 9 to 11% $CO_2$ oxidizing and preferably about 10% $CO_2$ oxidizing.

It will be appreciated that the matrix composition disclosed herein has a substantially lower fusing temperature than compositions heretofore proposed for use in bonding carbides and hard-facing metals to an article to be protected. Actual furnace temperatures may be and usually are considerably higher than the fusing temperature of the matrix alloy and such higher temperatures merely affect the time required for a particular article and the hard-facing layer to reach fusing temperature for reasons well known to those skilled in this art.

While the particular hard-facing matrix composition and method of preparing same herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A matrix composition for use in bonding dispersed carbides and the like abrasion resistant ingredients to the surface of a metallic body subject to wear, said matrix composition being characterized by the presence therein of metallic materials in proportions such that the melting point of said matrix composition ranges between 1950° and 2100° F. in a furnace atmosphere approximately in the range 9 to 11 percent $CO_2$ oxidizing and includes cobalt, ferrochromium, ferromanganese, ferromolybdenum, ferroboron, ferrosilicon, nickel, and copper.

2. A matrix composition for use in bonding dispersed carbides and the like abrasion resistant ingredients to the surface of a metallic body subject to wear, said matrix composition being characterized by the presence therein of metallic materials comprising an alloy coating for metals having improved resistance to shock, wear, spalling and crazing and capable of being bonded by fusion to steel and iron at a temperature of 2025° F. plus or minus 75° F. and consisting essentially, by weight, 1 to 8 percent cobalt, 15 to 30 percent ferrochromium, 1 to 8 percent ferromanganese, 0 to 5 percent ferromolybdenum, 0 to 3 percent ferroboron, 6 to 15 percent ferrosilicon, 0 to 3 percent copper and the balance nickel.

3. A matrix composition for use in bonding dispersed carbides and the like abrasion resistant ingredients to the surface of a metallic body subject to wear, said matrix composition being characterized by the presence there in of metallic materials comprising a coating alloy for metals to bond thereto a dispersion of wear-resisting carbides and said coating alloy being characterized by its improved resistance to chipping, crazing, spalling and fracturing and capability of fusing to iron and steel surfaces at a temperature of 2025° F. plus or minus 75° F., said coating alloy consisting essentially, by weight, about 4.8 percent cobalt, about 24.0 percent ferrochromium, about 4.5 percent ferromanganese, about 2.0 percent ferromolybdenum, about 1.5 percent ferroboron, about 10 percent ferrosilicon, about 52.5 percent nickel, and about 0.7 percent copper.

4. A matrix composition for use in bonding dispersed carbides and the like abrasion resistant ingredients to the surface of a metallic body subject to wear, said matrix composition being characterized by the presence therein of metallic materials comprising a coating alloy for metals to bond thereto a dispersion of wear-resisting carbides and said coating alloy being characterized by its improved resistance to chipping, crazing, spalling and fracturing and capability of fusing to iron and steel surfaces at a temperature of 2025° F. plus or minus 75° F., said coating alloy consisting essentially, by weight, about 4.8 percent cobalt; about 24.0 percent ferrochromium; about 4.5 percent ferromanganese; about 10 percent ferrosilicon; two metals selected from the group ferromolybdenum, ferroboron, and copper in the following amounts, namely, about 2.0 percent ferromolybdenum, about 1.5 percent ferroboron and about 0.7 percent copper; and the remainder nickel.

5. That method of preparing a matrix composition for use in bonding particles of carbides to iron and steel to provide a wear-resisting hard-facing thereon which method comprises, alloying, by weight, 1 to 8 percent cobalt, 15 to 30 percent ferrochromium, 1 to 8 percent ferromanganese, 0 to 5 percent ferromolybdenum, 0 to 3 percent ferroboron, 6 to 15 percent ferrosilicon, 0 to 3 percent copper and the remainder nickel, casting said alloy into pigs and crushing said pigs into granular material not in excess of 60 mesh size in readiness for admixture with granular carbides to provide a matrix composition having a fusing temperature of about 2025° F. plus or minus 75° F.

6. That method of preparing a matrix composition for use in bonding particles of carbides to iron and steel to provide a wear-resisting hard-facing thereon which method comprises, alloying, by weight, about 4.8 percent commercial grade cobalt, about 24 percent ferrochromium containing about 65 to 68 percent chromium, about 4.5 percent ferromanganese containing about 74 to 76 percent manganese, about 2.0 percent ferromolybdenum containing about 50 to 75 percent molybdenum, about 1.5 percent ferroboron containing 16 to 20 percent boron, about 10 percent ferrosilicon containing about 83 to 88 percent silicon, about 0.7 percent commercial grade copper, and the remainder commercial grade nickel.

7. That method defined in claim 6 which is characterized by casting a melt of said alloy into one or more pigs, and thereafter pulverizing the cooled pigs into particles not exceeding 60 mesh size.

8. A hard-facing composition for use in forming a protective nonspalling, nonchipping, noncrazing, highly tough abrasion resistant coating bondable to iron and steel and adapted to be fuse-bonded thereto at 2025° F. plus or minus 75° F. which composition comprises a matrix intermixed with finely divided wear-resisting constituents, said matrix consisting essentially, by weight, about 1 to 8 percent commercial grade cobalt, about 15 to 30 percent ferrochromium containing about 65 to 68 percent chromium, about 1 to 8 percent ferromanganese containing about 74 to 76 percent manganese, about 0 to 5 percent ferromolybdenum containing about 50 to 75 percent molybdenum, about 0 to 3 percent ferroboron containing about 16 to 20 percent boron, about 6 to 15 percent ferrosilicon containing about 83 to 88 percent silicon, about 0 to 3 percent commercial grade copper, and the remainder commercial grade nickel, and said wear resisting constituents comprising at least one of the finely ground materials tungsten carbide, boron carbide, molybdenum carbide and titanium carbide and present by weight in an amount from 0 to 80 percent of the amount of said matrix, and said hard-facing composition including a bonding flux ranging approximately from 3 to 8 percent by weight of said hard-facing composition.

9. A hard-facing composition as defined in claim 8 characterized in that said bonding flux includes, by weight, about 68 to 85 percent granular boric acid, about 10 to 27 percent granular borax, and about 2 to 10 percent granular sodium silicate.

10. A matrix composition as defined in claim 2 characterized in the presence therein of 3 to 8 percent by weight of a bonding flux consisting essentially, by weight, about 68 to 85 percent granular boric acid, about 10 to 27 percent granular borax, and about 2 to 10 percent sodium silicate.

11. A matrix composition as defined in claim 3 characterized in the presence therein of 3 to 8 percent by weight of a bonding flux consisting essentially, by weight, about 68 to 85 percent granular boric acid, about 10 to 27 percent granular borax, and about 2 to 10 percent sodium silicate.

12. A hard-facing composition as defined in claim 8 characterized in that said bonding flux includes, by weight, about 74 percent granular boric acid, about 21 percent granular borax and about 5 percent granular sodium silicate.

13. That method of preparing a matrix composition for use in bonding particles of carbides to metal to provide a wear-resistant hard-facing thereon which method comprises preparing a matrix composition by alloying, by weight, 1 to 8 percent cobalt, 1 to 8 percent ferromanganese, 0 to 5 percent ferromolybdenum, 15 to 30 percent ferrochromium, 0 to 3 percent ferroboron, 6 to 15 percent ferrosilicon, 0 to 3 percent copper and the remainder nickel, mixing ground particles of said alloy not in excess of 60 mesh size with particles of carbides and with a bonding flux, thereby to provide a matrix composition having a fusing temperature of about 2025 degrees F. plus or minus 75 degrees F. when in a heated furnace atmosphere approximately in the range of 9 to 11 percent $CO_2$ oxidizing.

References Cited
UNITED STATES PATENTS 2,205,864   6/1940   Schwarzkopf _____ 117—22 XR
2,261,228   11/1941   Cockrum.
2,611,710   9/1952   Woock _____ 106—1

JULIUS FROME, *Primary Examiner.*

L. B. HAYES, *Assistant Examiner.*